United States Patent Office 3,024,131
Patented Mar. 6, 1962

3,024,131
METAL PRIMERS FOR SILICONE RUBBER ADHESION
William E. Hutchinson, Midland, Mich., assignor to Dow Corning Corporation, Midland, Mich., a corporation of Michigan
No Drawing. Filed Dec. 18, 1959, Ser. No. 860,359
3 Claims. (Cl. 117—75)

This invention relates to the use of mono-(vinylphenyl)-alkylsiloxane as a primer coating on metals for improved adhesion of peroxide cured organopolysiloxane rubber.

The use of monoorganosiloxanes as primers is well-known. These materials are generally applied to surfaces to be primed as trifunctional silanes which hydrolyze and condense to siloxanes after application. The systems in which particular monoorganosiloxanes are effective differ a great deal however. For example, good metal primers are not always good wood primers, and primers for room-temperature vulcanizing silicone rubber are not always effective with peroxide-cured silicone rubber. In more specific systems it has been found, for example, that a good primer on steel is not necessarily a good primer on aluminum.

It is the primary object of this invention to provide a primer to be applied to metal surfaces to improve the adhesion thereto of peroxide-cured organopolysiloxane rubber. Another object is to provide a primer which is effective on the surfaces of several metals, especially aluminum. These objects are satisfied by this invention.

This invention relates to an article of manufacture comprising metal the surface of which is coated with a polysiloxane essentially each of the silicon atoms of which has attached thereto by an alkylene radical of less than three carbon atoms a vinylphenyl radical. This invention relates further to the method of treating a metal surface which comprises applying thereto an organosilicon composition consisting essentially of silicon atoms to each of which is attached by an alkylene radical of less than three carbon atoms a vinylphenyl radical, at least some of the remaining valences of the silicon atoms being satisfied by functions selected from the group consisting of halogen atoms, hydroxyl radicals and acyloxy radicals of less than four carbon atoms, any remaining silicon valences being satisfied by silicon-bonded oxygen atoms, and thereafter drying the treated surface.

The organosilicon compounds employed herein include both silanes and siloxanes. Essentially all of the silicon atoms have attached thereto a (vinylphenyl)ethyl radical or a (vinylphenyl)methyl radical, i.e. a vinylbenzyl radical. The (vinylphenyl)alkyl radical can have the following configurations:

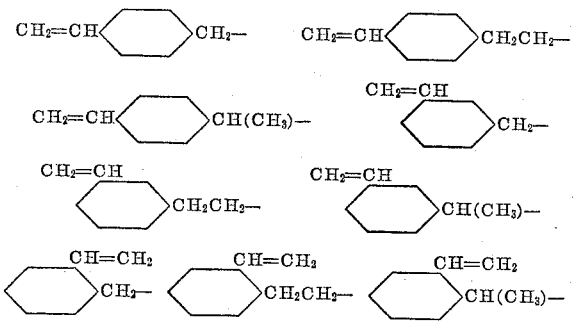

The silane silicon valences which are not satisfied with the (vinylphenyl)alkyl radical are satisfied with hydrolyzable groups including hydroxyl radicals, acyloxy radicals of less than four carbon atoms, i.e. the formoxy, acetoxy and propionoxy radicals, and halogen atoms such as the chlorine, bromine, iodine and fluorine atoms. The siloxane silicon valences which are satisfied with neither a (vinylphenyl)alkyl radical nor the silicon-bonded oxygen of a siloxane linkage are satisfied with any of the above-named hydrolyzable groups.

The vinylphenylethyl-substituted silanes of this invention are best prepared by reacting a trihalogenosilane such as trichlorosilane with divinylbenzene in the proportion of at least one mol divinylbenzene per mol of silane at a temperature of 50 to 70° C. in the presence of an addition catalyst such as platinum on charcoal or chloroplatinic acid. In carrying out the addition it is well to add a polymerization inhibitor such as catechol to minimize or prevent polymerization of the divinylbenzene. This reaction is generally applicable to the addition of divinylbenzene to any silane of the formula $HSiX_3$ where X is any of the hydrolyzable groups specified above.

The vinylphenylmethyl-substituted silanes of this invention are best prepared by preparing at room temperature a Grignard reagent of vinylbenylchloride and reacting this at room temperature in no more than a mol per mol ratio with a tetrahalogenosilane such as tetrachlorosilane to produce mono-vinylbenzyltrichlorosilane or mono-(vinylphenyl)methyltrichlorosilane.

The vinylphenylalkyl-substituted halogenosilanes can be converted to other desirable silanes by reaction with a suitable reagent such as a reaction with acetic anhydride to produce acetoxy silanes or by simple hydrolysis to produce hydroxylated silanes and partial hydrolyzates of said silanes, i.e. materials containing Si—O—Si linkages.

The articles of this invention are prepared by coating a metal surface with one of the above silanes, a partial hydrolyzate thereof, i.e. a siloxane homopolymer, a mixture of the above silanes, a partial hydrolyzate thereof, i.e. a siloxane copolymer, or any mixture of the above materials. These materials can be applied to the metal surface to be primed in any suitable manner such as by brushing, dipping, spraying or by exposing the metal surface to some silane vapor. The organosilicon compositions, i.e. the silanes and/or the partial hydrolyzates thereof, can be applied per se to the metal surface or they can be applied in the form of an aqueous dispersion, such as an emulsion, or a solvent dispersion, for example, in xylene, toluene, methylene chloride, isopropanol, perchloroethylene or methylisobutylketone. For a satisfactorily primed metal surface any priming dispersion should contain at least about 2 percent by weight of the organosilicon compositions.

When one of the above organosilicon compositions contacts the metal surface, hydrolysis and condensation of the composition thereon produces a coating of mono-(vinylphenyl)alkylsiloxane. The formation of the siloxane and its cure are facilitated by heating the coated metal so as to remove any solvent and hydrolysis by-product. The curing temperature is not critical and will vary with the form in which the silane is applied. For example, if the silane hydrolysis by-products (i.e. XH products) are volatile, a minimum of heating is required to remove them from the surface of the siliceous material and to set the siloxane. If these by-products are nonvolatile, then a higher temperature is needed or the siliceous material can be both heated and washed. In general, heating at temperatures from 100 to 200° C. for a few minutes is sufficient.

For a satisfactorily primed metal surface it is necessary that essentially the entire surface is coated with the siloxane.

The claimed articles of this invention are useful in any application in which a heat-curable peroxide-containing organopolysiloxane rubber is to be bonded to metal, for example, in oil and bearing seals and in roll coverings. The method of this invention is useful for preparing the primed metal articles of this invention.

The organopolysiloxane rubber stocks which adhere to the primed metal surfaces commonly contain as basic ingredients a diorganopolysiloxane gum in which the organic radicals are commonly monovalent hydrocarbon radicals, especially the methyl, vinyl and phenyl radicals, a filler most commonly a finely divided silica and an organic peroxide such as benzoyl peroxide or tertiary-butyl peroxide as a vulcanizing agent. There are generally from 20 to 400 parts by weight of filler and 0.5 to 10 parts by weight of peroxide per 100 parts by weight of diorganopolysiloxane. Generally, additives are included for stability, pigmentation or the like. These rubber stocks are applied to the primed metal surfaces and are vulcanized by heating above the activation temperature of the peroxide, generally in the range of 230 to 500° F., until vulcanization is complete.

The following examples are merely illustrative of the best methods for practicing this invention and are not intended to limit this invention which is properly delineated in the claims.

EXAMPLE 1

A mixture of meta and para divinylbenzene was reacted with trichlorosilane in the mol ratio of 1.5 mols of divinylbenzene per mol of trichlorosilane as follows:

The divinylbenzene was mixed with t-butylcatechol and warmed at 100° C. The trichlorosilane was then added slowly whereupon addition took place to produce a mixture of the meta and para isomers of the alpha- and beta-(vinylphenyl)ethyltrichlorosilanes. This material has the following properties: B.P. 97 to 100° C. at .6 mm., $d_4^{25}$ of 1.212 and $n_D^{25}$ 1.5300.

EXAMPLE 2

0.4 mol of a mixture of meta and para isomers of alpha- and beta-(vinylphenyl)ethyltrichlorosilanes was mixed with 1.32 mols of acetic anhydride and the mixture was warmed one hour at 60° C. The by-produced acetyl chloride and excess acetic anhydride were removed by distillation. The residue was a mixture of the meta and para isomers of alpha- and beta-(vinylphenyl)ethyltriacetoxysilanes having a sp. gr. of 1.119, $n_D^{25}$ of 1.4848 and a viscosity at 25° C. of 58.8 cs.

EXAMPLE 3

A mixture of the meta and para isomers of alpha- and beta-(vinylphenyl)ethyltrichlorosilanes was dissolved in methylene chloride. This solution was added dropwise to a solution-in-water of sodium bicarbonate present in an amount equivalent to a 10 percent by weight excess of the sodium bicarbonate required to react with all the silicon-bonded chlorine. The methylene chloride layer was then separated and washed. It contained 20 percent by weight of a mixture of the meta and para isomers of the alpha- and beta-(vinylphenyl)ethyltrihydroxysilanes and partial condensates thereof.

EXAMPLE 4

The following tests were made with steel and aluminum panels which had been cleaned with perchloroethylene and acetone. These panels were brushcoated with one of the following solutions:

A. A 5 percent by weight solution in xylene of the trichlorosilanes produced in Example 1;
B. A 5 percent by weight solution in xylene of the triacetoxysilanes produced in Example 2; and
C. The 20 percent by weight solution in methylene chloride of the trihydroxysilanes and partial condensates thereof produced in Example 3.

The resulting coatings were allowed to air-dry. Uniform strips of inch wide tape were made out of a commercial heat-curable organopolysiloxane rubber stock consisting essentially of a dimethyl-methylvinylpolysiloxane gum copolymer, approximately 51 parts by weight of inorganic filler, primarily siliceous material, and about 1 part by weight of dichlorobenzoyl peroxide, the weights of the filler and the peroxide based on 100 parts by weight of the copolymer. The tape strips were bonded to each of the primed panels by pressing them on the panels at approximately 250 p.s.i. and heating for 10 minutes at 255° F. Subsequently, the panels with the tapes bonded thereto were oven-cured as shown below. The adhesion of the tapes to the panels was determined by measuring the average pounds of force necessary to pull each tape at an angle of 180° and at a rate of 2 inches per minute from its panel. For the curing conditions shown the panel-primer-rubber bond in each case was stronger than the rubber itself, i.e. the rubber failed under the force shown in the table.

*Table I*

| Primer | Panel | Cure | |
|---|---|---|---|
| | | 4 hrs. at 300° F. | 2 hrs. at 400° F. |
| A | Steel | 15.0 | 22.2 |
| B | do | 19.0 | 22.5 |
| C | do | 14.0 | 15.8 |
| A | Aluminum | 21.5 | 19.8 |
| B | do | 20.0 | 19.0 |

Similar results are obtained when a commercial organopolysiloxane rubber stock based on a dimethylpolysiloxane gum is substituted for the stock employed herein.

EXAMPLE 5

The tests of Example 4 were repeated employing primer B, copper and brass panels and an oven-cure of 2 hours at 400° F. Again in each case the tape itself failed rather than the panel-primer-rubber bond.

*Table II*

| Primer | Panel | Cured for 2 hrs. at 400° F. |
|---|---|---|
| B | Copper | 21.8 |
| B | Brass | 17.6 |

EXAMPLE 6

The tests of Example 4 were repeated employing primer B and a commercial heat-curable peroxide-containing high strength organopolysiloxane rubber stock consisting essentially of a dimethyl-phenylmethyl-methylvinylpolysiloxane gum copolymer, 52 parts by weight of a silica filler, and 1.6 parts by weight of a mixture of dichlorobenzoylperoxide and tertiary-butylperbenzoate, the weights of the filler and the peroxide based on 100 parts by weight of the copolymer. Again in each case the tape itself failed.

*Table III*

| Primer | Panel | Cure | |
|---|---|---|---|
| | | 4 hrs. at 300° F. | 2 hrs. at 400° F. |
| B | Steel | 53.0 | 45.7 |
| B | Aluminum | 40.0 | 35.0 |

EXAMPLE 7

The tests of Example 4 were repeated on steel using for the primer D a 5 percent by weight solution in a 25:44:31 weight percent toluene-isopropanal-acetone mixture of the triacetoxysilanes produced in Example 2. The tape failed in each case.

Table IV

| Primer | Panel | Cure | |
|---|---|---|---|
| | | 4 hrs. at 300° F. | 2 hrs. at 400° F. |
| D | Steel | 57.0 | 60.0 |

EXAMPLE 8

When a polyisomeric mixture of monovinylbenzyltrichlorosilane prepared by the Grignard addition of ortho-, meta- and para-vinylbenzylchloride to silicon tetrachloride is substituted for the mono-(vinylphenyl)ethyltrichlorosilane in primer A of Example 4, a similar excellent primer coating is achieved on both the steel and the aluminum panels.

EXAMPLE 9

When the products of Examples 1 and 2 are each partially hydrolyzed and condensed to chlorosiloxanes and acetoxysiloxanes respectively prior to their incorporation in the tests of Example 4, the results are essentially unchanged.

EXAMPLE 10

When propionic anhydride is substituted for acetic anhydride in Example 2 and a 10 percent by weight solution in xylene of the resulting mixture of meta and para isomers of alpha- and beta-(vinylphenyl)ethyltripropionoxysilanes is substituted for primer B in Example 4, the results are essentially the same.

EXAMPLE 11

When pure 1,2-divinylbenzene is employed in the preparation described in Example 1 and the resulting mixture of alpha- and beta-(o-vinylphenyl)ethyltrichlorosilanes are substituted for the isomeric chlorosilane mixture employed in primer A of Example 4, the test results are essentially the same.

EXAMPLE 12

When tribromosilane is substituted for the trichlorosilane of Example 1 and the resulting products are employed in primer A in Example 4, the resulting primer coating is as effective as that achieved with primer A.

That which is claimed is:

1. A method of treating a metal surface which comprises applying thereto an organosilicon composition consisting essentially of silicon atoms to each of which is attached through an alkylene radical of less than three carbon atoms a vinylphenyl radical, at least some of the remaining valences of the silicon atoms being satisfied by functions selected from the group consisting of halogen atoms, hydroxyl radicals and acyloxy radicals of less than four carbon atoms, any remaining silicon valences being satisfied by silicon-bonded oxygen atoms, and thereafter drying the treated surface.

2. A method of treating a metal surface which comprises applying thereto an organosilicon composition consisting essentially of silicon atoms to each of which is attached through an alkylene radical of less than three carbon atoms a vinylphenyl radical, at least some of the remaining valences of the silicon atoms being satisfied by functions selected from the group consisting of halogen atoms, hydroxyl radicals and acyloxy radicals of less than four carbon atoms, any remaining silicon valences being satisfied by silicon-bonded oxygen atoms, drying the treated surface, applying to said treated surface an unvulcanized rubber stock consisting essentially of a diorganopolysiloxane, a filler and an organic peroxide vulcanizing agent and vulcanizing said rubber stock, whereby the cured rubber firmly adheres to the treated metal surface.

3. An article of manufacture comprising metal, the surface of which is coated with a monoorganopolysiloxane to each silicon atom of which is attached through an alkylene radical of less than three carbon atoms a vinylphenyl radical.

References Cited in the file of this patent
UNITED STATES PATENTS

| 2,601,337 | Smith-Johannsen | June 24, 1952 |
| 2,645,628 | Hurd | July 14, 1953 |
| 2,721,856 | Sommer | Oct. 25, 1955 |